J. S. PATTERSON.
Potato Fork.
No. 59,061.
Patented Oct. 23, 1866.
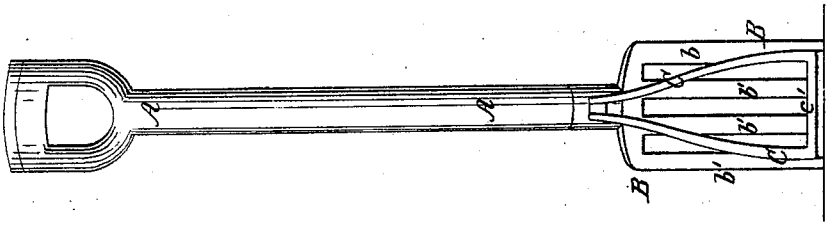
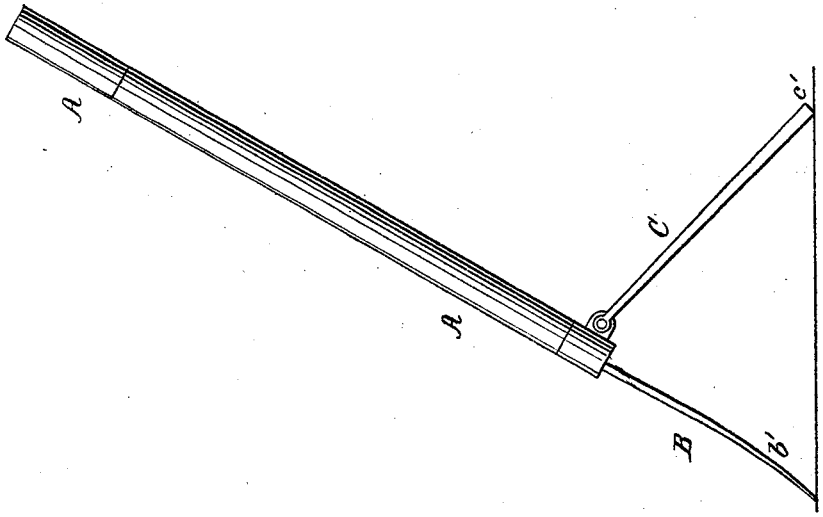
Witnesses:
F. A. Jackson
Theo. Lusch
Inventor:
J. S. Patterson
Per Munn & Co.
Attorneys

UNITED STATES PATENT OFFICE.

J. S. PATTERSON, OF WHITNEY'S POINT, NEW YORK.

IMPROVEMENT IN POTATO-FORKS.

Specification forming part of Letters Patent No. 59,061, dated October 23, 1866.

*To all whom it may concern:*

Be it known that I, J. S. PATTERSON, of Whitney's Point, in the county of Broome and State of New York, have invented a new and useful Improvement in Garden and Potato Forks; and I do hereby declare that the following is a full, clear, and exact description thereof, which will enable others skilled in the art to make and use the same, reference being had to the accompanying drawings, forming a part of this specification, in which—

Figure 1 is a side view of my improved fork. Fig. 2 is a rear view of the same.

Similar letters of reference indicate like parts.

My invention consists in the combination of a triangular fulcrum with a fork, as hereinafter more fully described, for the purpose of furnishing a fork by means of which weeding may be done in a garden, and potatoes or other vegetables dug, and which will do its work thoroughly, easily, and rapidly.

A is the handle, and B are the tines or head, of an ordinary garden-fork, about the construction of which there is nothing new.

C is a triangular fulcrum or rest, which is made substantially in the form shown in Fig. 2. The upper end of the fulcrum or rest C is pivoted to a projecting ear formed upon or attached to the lower end of the handle A, or to the ferrule attached to the lower end of said handle.

The form of the tines $b'$ of the fork-head B should vary in the ordinary manner, according to the different purposes for which the fork is to be used.

In using my improved fork to weed a garden-bed, the operator should place it before him between the rows, with one hand upon the handle A and his foot upon the horizontal or bottom part, $c'$, of the fulcrum or rest C. Then, by pressing the handle forward, the fulcrum C will be drawn toward the fork B, and by an easy motion of the handle backward the tines $c'$ will be pressed forward, loosening the earth and weeds; and if the ground is all loose it can be worked as fast as the operator can follow it up.

In using the fork to dig potatoes, the operator puts his foot upon the bottom part, $c'$, of the fulcrum C, and pulling the handle A backward, he forces the hill of potatoes, vines and all, from the ground without injuring the potatoes, as is liable to be done when they are dug with a hoe in the ordinary manner.

I have described my improvement as being applied to a fork; but it is equally applicable to a spade or shovel.

Having thus described my invention, I claim as new and desire to secure by Letters Patent—

1. Pivoting a fulcrum or rest to the lower part of a garden or potato fork, substantially as herein shown and described.

2. The fulcrum or rest C, constructed as herein shown and described, in combination with a garden or potato fork, substantially as and for the purpose set forth.

J. S. PATTERSON.

Witnesses:
I. G. DUNDORE,
ISAAC T. STODDARD.